US010261719B2

(12) United States Patent
Liu et al.

(10) Patent No.: US 10,261,719 B2
(45) Date of Patent: Apr. 16, 2019

(54) VOLUME AND SNAPSHOT REPLICATION

(71) Applicant: HEWLETT PACKARD ENTERPRISE DEVELOPMENT LP, Houston, TX (US)

(72) Inventors: Lisa Baochyn Liu, Cupertino, CA (US); Sonali Somyalipi, Fremont, CA (US); Robert Raymond Neal-Joslin, Livermore, CA (US); Nathaniel Rogers, Fremont, CA (US); Sujatha Mudupalli, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 129 days.

(21) Appl. No.: 15/421,149

(22) Filed: Jan. 31, 2017

(65) Prior Publication Data

US 2018/0217756 A1 Aug. 2, 2018

(51) Int. Cl.
*G06F 3/06* (2006.01)
(52) U.S. Cl.
CPC ............ *G06F 3/065* (2013.01); *G06F 3/0619* (2013.01); *G06F 3/0683* (2013.01)
(58) Field of Classification Search
CPC ....... G06F 3/065; G06F 3/0619; G06F 3/0683
See application file for complete search history.

(56) References Cited

U.S. PATENT DOCUMENTS

| 7,043,485 B2 | 5/2006 | Manley et al. |
| 7,165,156 B1 | 1/2007 | Cameron et al. |
| 7,243,115 B2 | 7/2007 | Manley et al. |
| 7,305,530 B2 | 12/2007 | Daniels et al. |
| 7,937,547 B2 | 5/2011 | Liu et al. |

(Continued)

OTHER PUBLICATIONS

Shim, H. et al., "Characterization of Incremental Data Changes for Efficient Data Protection," (Research Paper), 2013 USENIX Annual Technical Conference (USENIX ATC 13), 2013, 12 pages, available at http://0b4af6cdc2f0c5998459-c0245c5c937c5dedcca3f1764ecc9b2f.r43.cf2.rackcdn.com/11747-atc13-shim.pdf.

(Continued)

*Primary Examiner* — Eric Cardwell
(74) *Attorney, Agent, or Firm* — Hewlett Packard Enterprise Patent Department

(57) ABSTRACT

Examples include volume and snapshot replication. In some examples, a user-initiated snapshot of a volume at a source array may be created, wherein the user-initiated snapshot has a pending status and the volume is a member of a set of volumes in a replication group. A synchronization snapshot may be created of the volume at a periodic synchronization time. The synchronization snapshot may have a pending status. Each snapshot of the volume may be stored at the source array and each snapshot may be recorded via a representative entry in an original snapshot list. The volume may be incrementally replicated to a target array such that the target array has a replica of the volume at the source array via a replication engine. Creation of a corresponding snapshot at the target array may be requested after each incremental replication of the volume such that each snapshot recorded in the original snapshot list is recreated and stored at the target array and the original snapshot list is recreated as a recreated snapshot list at the target array.

16 Claims, 11 Drawing Sheets

(56) References Cited

U.S. PATENT DOCUMENTS

| | | |
|---|---|---|
| 8,078,816 B1 | 12/2011 | Thoppai et al. |
| 8,433,872 B2 | 4/2013 | Prahlad et al. |
| 8,706,833 B1 * | 4/2014 | Bergant ............ G06F 17/30215 709/214 |
| 8,805,786 B1 | 8/2014 | Natanzon |
| 2005/0065985 A1 * | 3/2005 | Tummala .......... G06F 17/30067 |
| 2005/0187992 A1 * | 8/2005 | Prahlad ............... G06F 11/1435 |
| 2015/0378636 A1 | 12/2015 | Yadav et al. |

OTHER PUBLICATIONS

Nimble Storage, "Nimble Storage User Guide," Jun. 12, 2014, Nimble OS Version 2.1.x.

* cited by examiner

VOLUME AND SNAPSHOT REPLICATION

BACKGROUND

Storage solutions may be tasked with storing high-value data. In many instances, it may be essential that the data be readily accessible, even in the event of a failure. To ensure high availability of critical data, some storage solutions employ redundancy or replication techniques.

BRIEF DESCRIPTION OF THE DRAWINGS

The following detailed description references the drawings, wherein.

DETAILED DESCRIPTION

Increasingly, storage systems are being asked to provide continuous operation with fewer failures and greater availability of critical data. Some systems employ redundancy such that data is available in multiple locations and single points of failure are avoided. These systems decrease data loss while reducing downtime. In some examples, redundancy may be achieved via cloning in which the data is copied in full. In other examples, redundancy may be achieved via snapshots, which capture data—and subsequent changes to that data—at particular points in time.

Some storage systems employ periodic replication such that snapshots occur simultaneously for all volumes within a replication group. These systems may be unable to incorporate on-demand, user-initiated snapshots or take snapshots of individual volumes or a subset of volumes within the replication group. Other storage systems may involve snapshot management at a secondary site. However, such systems may be ill-suited to take advantage of pertinent knowledge at a primary site.

Examples described herein may improve flexibility in the use and management of snapshots between a source array and a target array. User-initiated snapshots of a volume may be created and replicated in conjunction with synchronous snapshots of the volume taken periodically. The target array may also include a replica of the volume at the source array as well as a recreated snapshot list that is identical to a snapshot list at the source array to ensure high availability of data that allows for selection of data state at various points in time in the event of a failure. In some examples, snapshots may be deleted, at the source array, from both the source array and the target array. In other examples, a snapshot may be taken of a subset of volumes within a replication group. In yet other examples, a new volume may be added to a replication group and replicated to the target array with any pre-existing snapshots.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. In addition, in examples described herein, a determination, action, etc., that is said to be "based on" a given condition may be based on that condition alone or based on that condition and other condition(s).

Figure 1A:
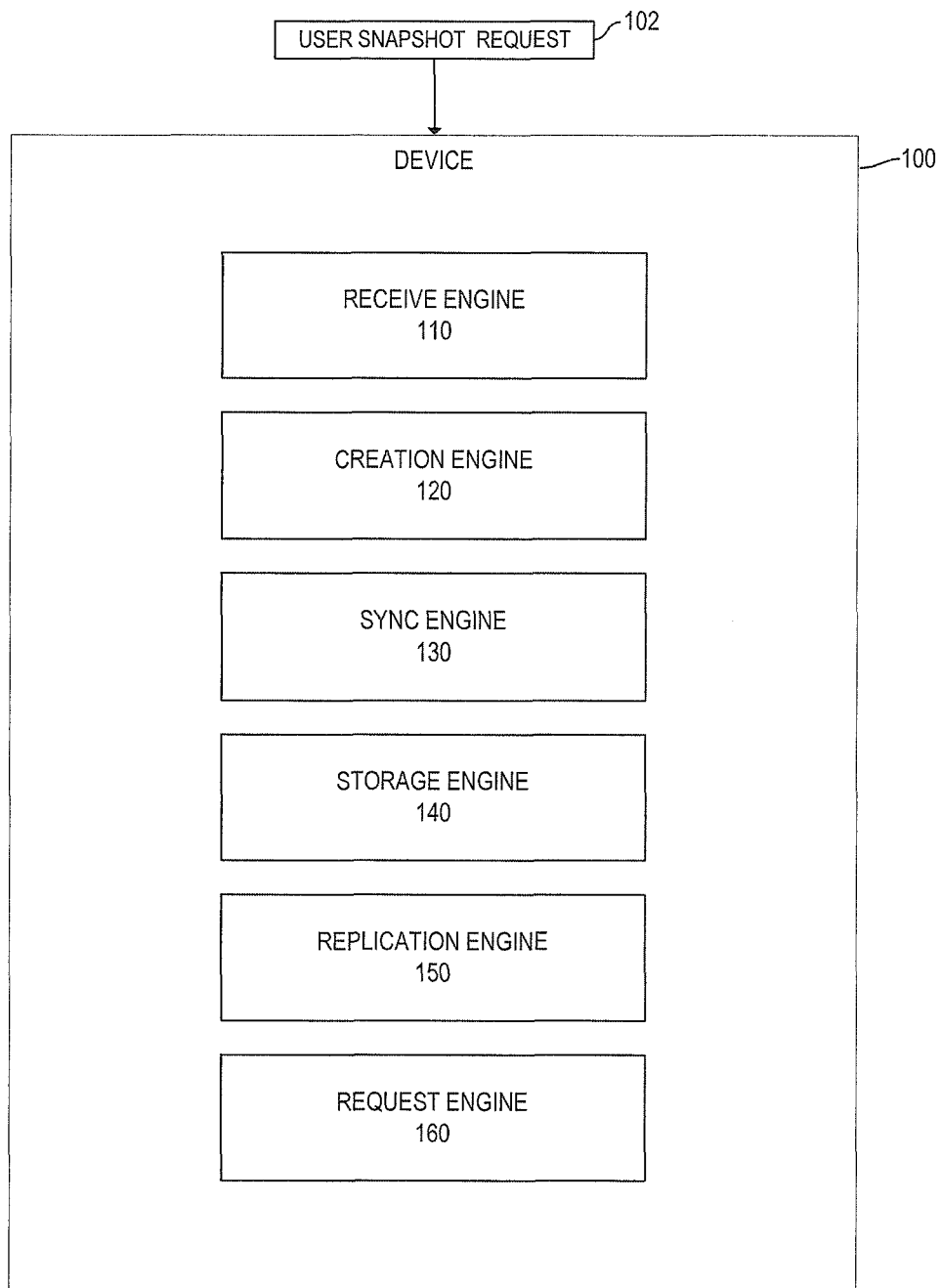
FIGS. 1A and 1B are block diagrams of example devices to replicate a volume at a source array to a target array that includes user-initiated snapshots and synchronization snapshots.
Figure 1B:
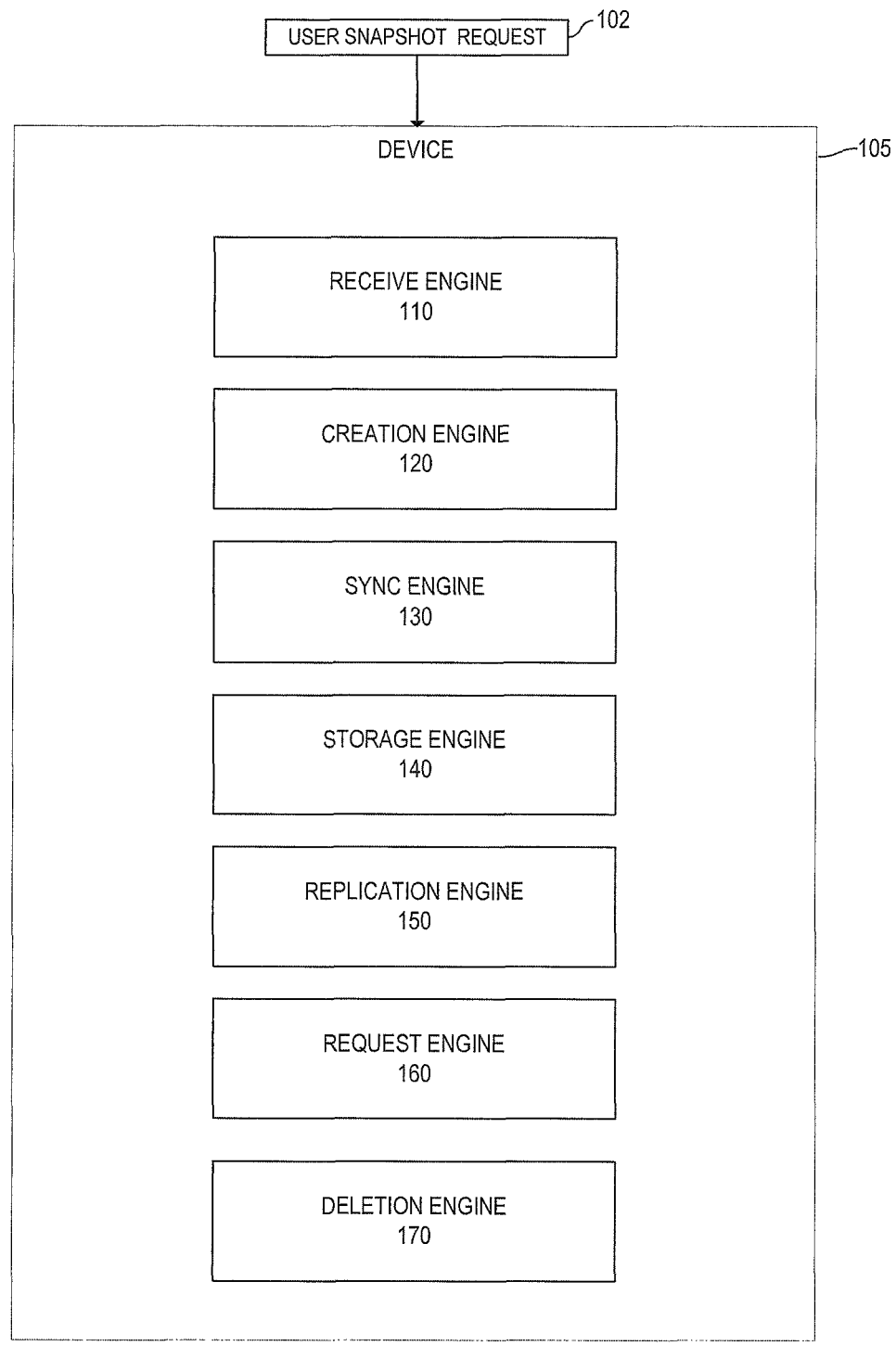

Referring now to the drawings, FIGS. 1A and 1B are block diagrams of example devices that replicate a volume of a source array to a target array using user-initiated snapshots and synchronous snapshots. An array, as used in the examples herein, may refer to a data storage system used for block-based, file-based, or object storage that is made up of a storage drive (e.g., a hard drive), a solid state drive, any type of storage disc (e.g., a compact disc, a DVD, etc.), and the like, or a combination thereof. A source array, as used herein, may refer to an array at a first domain, a master or primary site, and the like. A target array, as used herein, may refer to an array at a second domain, a slave or secondary site, and the like. In the examples described herein, a volume may refer to a portion of a source array and may be made up of a storage drive (e.g., a hard drive), a solid state drive, any type of storage disc (e.g., a compact disc, a DVD, etc.), and the like, or a combination thereof. In some examples, a large volume may be divided or partitioned into multiple logical volumes.

FIG. 1A depicts an example device 100 that includes engines 110, 120, 130, 140, 150, and 160. Device 100 may be any networking or computing device suitable for execution of the functionality described below. As used herein, a device may be a desktop computer, laptop (or notebook) computer, workstation, tablet computer, mobile phone, smart device, switch, router, server, blade enclosure, or any other processing device or equipment including a processing resource. In some examples, device 100 may be located at a controller node or processing resource of a source array.

Engines described herein, (e.g., engines 110, 120, 130, 140, 150, 160, 170, etc.) may include any combination of hardware and programming (which includes both hardware and programming) to implement the functionalities of the engines described herein. In examples described herein, such combinations of hardware and programming (e.g., software such as machine-readable instructions) may be implemented in a number of different ways. For example, the programming may involve processing resource executable instructions stored on a non-transitory machine-readable storage medium and the hardware may include a processing resource to execute those instructions. In some examples, the hardware may also include other electronic circuitry to partially implement at least one engine of device 100. In some examples, the machine-readable storage medium may store instructions that, when executed by the processing resource, partially implement some or all engines of device 100. In such examples, device 100 may include the machine-readable storage medium storing the instructions and the processing resource to execute the instructions.

In other examples, the functionalities of any engines of device 100 may be at least partially implemented in the form of electronic circuitry. In some examples, functionalities described herein in relation to FIG. 1A may be provided in combination with functionalities described herein in relation to any of FIGS. 1B and 2-5.

As used herein, a machine-readable storage medium may be any electronic, magnetic, optical, or other physical storage apparatus to contain or store information such as executable instructions, data, and the like. For example, any machine-readable storage medium described herein may be any of RAM, volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described above in relation to instructions 130, 140, and 160. In other examples, the functionalities of any of the instructions of storage medium 120 may be implemented in the form of electronic circuitry, in the form of executable instructions encoded on a machine-readable storage medium, or a combination thereof. In the example of FIG. 1A, storage medium 120 may be implemented by one machine-readable storage medium, or multiple machine-readable storage media.

In the example of FIG. 1A, device 100 includes receive engine 110 to receive a user snapshot request to create a user-initiated snapshot of a volume. A user snapshot request, as used herein, is an on-demand snapshot request from a user (e.g., administrator, etc.) to create a snapshot of a volume at the time of the user snapshot request. Creation of the user-initiated snapshot will not be delayed for a periodic replication process. In the examples described herein, a snapshot may refer to a space-efficient capture of a data state at a particular point in time. In some examples, the user may generate and send the user snapshot request to device 100 via a user interface at the source array.

The volume is a member of a set of volumes in a replication group. A replication group, as used herein, may refer to a logic object that includes a set of replication objects, each of which identify a volume of the source array that is to be replicated to the target array. The replication group may represent a consistent point-in-time for all members of the group at a target array. In some examples, each volume of the set of volumes may be associated with a corresponding replication object. A replication object is a logic object used to identify a volume of the source array. In some examples, each replication object may have a unique identifier.

In response to receive engine 110 receiving the user snapshot request, creation engine 120 may create the user-initiated snapshot. In some examples, the user-initiated snapshot may be created using a copy-on-write technique such that the snapshots capture modifications or changes to the data via copy operations that do not occupy space when changes to the data have not occurred. In other examples, the user-initiated snapshot may be created using a redirect-on-write technique such that the snapshots capture modifications or changes to the data via redirect operations rather than creating a copy via a copy operation.

In some examples, the user-initiated snapshot may be a read-only (RO) snapshot. An RO snapshot may keep track of which data blocks have changed via an exception table. As blocks are changed, those changes are marked in the exception table, the snapshot is updated with the original data, and the original volume is updated with the new data. In other examples, the user-initiated snapshot may be a read-write (RW) snapshot. Like an RO snapshot, the RW snapshot may also track changes to data blocks via an exception table. Additionally, if data is written to the snapshot, that block may be marked in the exception table as used, but does not get copied from the original volume. In this way, new volumes may be created and modified. Based (at least in part) on the user snapshot request, creation engine 120 may create the user-initiated snapshot by any suitable technique to be either an RO snapshot or a RW snapshot.

Creation engine 120 may set the status of the user-initiated snapshot to pending. A pending status, as used herein, refers to a replication status of the snapshot and indicates that the user-initiated snapshot has not yet been replicated to the target array. In some examples, the status of the user-initiated snapshot may be saved to persistent memory such that the replication status can be restored in the event of a crash or failure. Setting the status to pending may involve flagging, tagging, or otherwise indicating that the snapshot has not yet been replicated to the target array. This status may be set in the original snapshot list.

Creation engine 120 may also associate a replication object with the user-initiated snapshot and add the replication object to the replication group. In some examples, the replication group may include a set of replication objects. At a same periodic replication time, an associated synchronous snapshot may be created for each replication object of the replication group and incrementally replication to a target array to ensure point-in-time consistency for all of the replication objects in the replication group.

In some examples, a user-initiated snapshot may not be associated with a replication object or added to the replication group. In some such examples, only those replication objects that are members of the replication group may be replicated to the target array and the user-initiated snapshot may not be incrementally replicated to the target array.

Synchronization engine 130 may periodically create a synchronization snapshot of the volume at a periodic synchronization time. A synchronization snapshot, as used herein, may refer to a snapshot that is periodically created via a periodic replication process. In some examples, a user may determine and set the periodic synchronization time in view of a variety of considerations, including, cost, storage resources, criticality of the data, estimated data losses in between periodic synchronizations, and the like. Periodic synchronization times that are farther apart may use fewer resources, but result in greater loss of data in the event of a system crash. Similarly, periodic synchronization times that are closer in time may use more resources, but may result in less loss of data in the event of a system crash.

The synchronization snapshot, like the user-initiated snapshot, may be created via any suitable technique for creating a snapshot, including the copy-on-write technique, the redirect-on-write technique, and the like. After creating the synchronization snapshot, synchronization engine 130 may set the status of the synchronization snapshot to pending. In some examples, the status of the synchronization snapshot may be saved to persistent memory such that the replication status can be restored in the event of a crash or failure.

Device 100 further includes storage engine 140 to store each snapshot of the volume at the source array. Storage engine 140 further records each snapshot via a representative entry in an original snapshot list at the source array. Each snapshot of the volume is stored to enable the snapshots to be replicated to the target array and to facilitate recovery of the volume in the event of a crash. A snapshot list, as used herein, refers to a collection of entries representing the snapshots for a given volume. A representative entry refers to an entry or listing in the snapshot list that is associated with a snapshot of the volume. In some examples, the snapshot list is a collection of snapshot metadata. In some examples, the entries in the snapshot list may identify a chronological order or the status of the snapshots. A snapshot list may be stored in a table structure, a database structure, or any other suitable structure. The original snapshot list refers to the snapshot list of the volume at the source array.

Replication engine 150 incrementally replicates the volume to the target array such that the target array has a replica of the volume at the source array. For instance, the volume of the source array may be replicated to a target volume of the target array. In some examples, replication may occur at the periodic synchronization time and may copy changes in the volume at the source array to the target array by way of the snapshots. In some examples, replication may be iterative, with changes between the snapshots replicated on an incremental basis to the target array. Replication ends when the target array has a replica of the volume at the source array as of the most recent snapshot. Thus, in the example of FIG. 1A, replication of the source array to the target array would end when the target array is a replica of the source array in its state at the periodic synchronization time.

Request engine 160 operates alongside replication engine 150 to request creation of a corresponding snapshot at the target array after each incremental replication of the volume. Accordingly, after the changes documented by each snapshot are replicated from the volume at the source array to the target array, request engine 160 requests the target array to create a corresponding snapshot at the target array such that each snapshot recorded in the original snapshot list is recreated and stored at the target array and the original snapshot list is recreated as a recreated snapshot list at the target array. Accordingly, the target array stores copies of each snapshot stored at the source array as well as a recreated snapshot list like the original snapshot list stored at the source array. In some examples, after the target array creates the corresponding snapshot, it may reply to the source array to indicate completion. After the snapshot at the source array has been replicated to the target array and the target array has created a corresponding snapshot, in some examples, the pending status of the snapshot at the source array may be updated to a completed status to indicate that replication is complete.

FIG. 1B is a block diagram of an example device 105 that replicates a volume of a source array to a target array using user-initiated and synchronous snapshots. Like device 100 of FIG. 1A, device 105 of FIG. 1B also includes engines 110, 120, 130, 140, 150, and 160. Device 105 additionally includes engine 170. As described above in relation to FIG. 1A, device 105 may be any networking or computing device suitable for execution of the functionality described herein and engines 110, 120, 130, 140, 150, 160, and 170 may include any combination of hardware and programming (which includes both hardware and programming) to implement the functionalities of the engines described herein. In some examples, functionalities described herein in relation to FIG. 1B may be provided in combination with functionalities described herein in relation to any of FIGS. 1A and 2-5.

Device 105 of FIG. 1B, like device 100 of FIG. 1A includes receive engine 100, creation engine 120, synchronous engine 130, storage engine 140, replication engine 150, and request engine 160. These engines implement the functionalities and operate in the same way as their similarly named and numbered engines discussed above in FIG. 1A.

Figure 4:
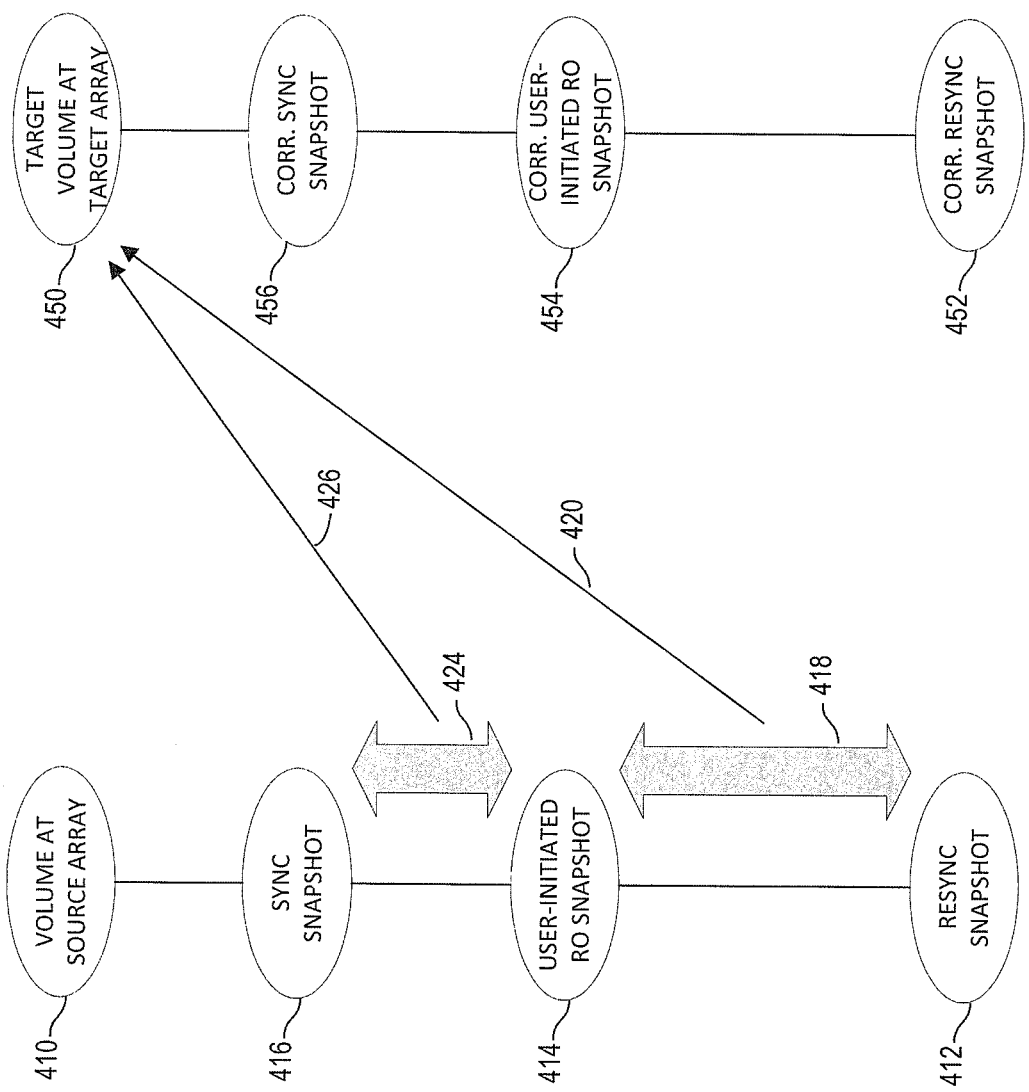
FIGS. 4 and 5 are example flow diagrams of an incremental replication of a volume at a source array to a target array.

In some examples, receive engine 110 may receive a user snapshot request to create a user-initiated snapshot, in which the user-initiated snapshot is an RO snapshot. Creation engine 120 may create the user-initiated RO snapshot, associate an RO replication object with the user-initiated RO snapshot, and add the RO replication object to the replication group. In some such examples, replication engine 150 may incrementally replicate the volume at the source array to the target array as depicted in FIG. 4. FIG. 4 illustrates flow diagrams of example incremental replications of a volume at source array 410 to target array 450. Although replication engine 150 is described below with reference to FIG. 4, other suitable configurations and examples may also apply (e.g., FIG. 5).

Replication engine 150 may perform an incremental replication by identifying a resynchronization snapshot 412 of the volume at source array 410. A resynchronization snapshot, as used herein, refers to an initial synchronization snapshot or a previous synchronization snapshot at a previous synchronization time that has a completed status. In other words, the resynchronization snapshot is a synchronization snapshot that was previously replicated to the target array. In the example of FIG. 4, resynchronization snapshot 412 was replicated to a target volume of target array 450 (referred to herein as either target array 450 or target volume of target array 450) as corresponding resynchronization snapshot 452 in the previous periodic replication and thus represents a replica of the state of the volume as it was at the previous periodic synchronization time.

Replication engine 150 may further identify an oldest (i.e., least recent) snapshot having a pending status at source array 410. In the example of FIG. 4, the oldest snapshot that has not yet been replicated to target array 450 and thus has a pending status is the user-initiated RO snapshot 414. In other examples, the oldest snapshot having a pending status at source array 410 may instead be a synchronization snapshot such as synchronization snapshot 416.

Based (at least in part) on identifying the resynchronization snapshot and the oldest snapshot having a pending status (i.e., the user-initiated RO snapshot), replication engine 150 may compute a data delta 418 between the two. A data delta, as used herein, refers to data differences between a first and second snapshot. In some examples, computing the data delta may include metadata such that the computation identifies differences in both the data and metadata. The data delta may be computed by comparing differences between resynchronization snapshot 412 and the oldest pending snapshot, user-initiated RO snapshot 414. In some such examples, exception tables may be used for the comparison. Resynchronization snapshot 412 may provide the delta base for the data delta computation.

Replication engine 150 may replicate the data delta between the oldest pending snapshot (user-initiated RO snapshot 414) and resynchronization snapshot 412 to target array 450, as shown by arrow 420. Replicating the data delta may replicate the state of the volume at the time user-initiated RO snapshot 414 was taken to target array 450. In other words, a target volume at target array 450 is brought to the same image as the oldest pending snapshot. Replication may occur via any suitable data copying or data transfer technique.

Once data delta 418 has been replicated to target array 450, request engine 160 requests creation of a corresponding snapshot at the target array. In some examples, the corresponding snapshot may be created, stored, and recorded in a recreated snapshot list at the target array. Corresponding user-initiated RO snapshot 454 at target array 450 is the corresponding oldest snapshot. In some examples, target array 450 may send source array 410 a message indicating that the corresponding oldest snapshot has been created. After the creation of the corresponding oldest snapshot at the target array, replication engine 150 updates the pending status of the oldest snapshot (i.e., user-initiated RO snapshot 414) to indicate that the replication of the oldest snapshot to target array 450 is complete.

Replication engine 150 may further identify, in chronological order beginning with a least recent (i.e., the oldest), a next snapshot having a pending status. In the example of FIG. 4, the least recent pending snapshot, once user-initiated RO snapshot 414 has been replicated to target array 450, is synchronization snapshot 416. In other examples, the least recent pending snapshot may be another user-initiated RO snapshot or even a user-initiated RW snapshot. Based (at least in part) on identifying the least recent pending snapshot, replication engine 150 may compute the data delta between the least recent pending snapshot and a most recent completed snapshot. In the example of FIG. 4, the most recent completed snapshot is user-initiated RO snapshot 414. Data delta 424 may be computed by comparing differences between user-initiated RO snapshot 414 and synchronization snapshot 416. User-initiated RO snapshot 414 may provide the delta base for the data delta computation.

Replication engine 150 may next replicate data delta 424 to target array 450, as shown by arrow 426. This brings a target volume at target array 450 to the same image as synchronization snapshot 416. Once data delta 424 has been replicated to target array 450, request engine 160 requests creation of a corresponding snapshot at the target array. In some examples, the corresponding snapshot may be created, stored, and recorded in a recreated snapshot list at the target array. Corresponding synchronization snapshot 456 at target array 450 is the corresponding least recent snapshot. In some examples, target array 450 may send source array 410 a message indicating that the corresponding least recent snapshot has been created. After the creation of this corresponding least recent snapshot at the target array, replication engine 150 updates the pending status of the least recent snapshot (i.e., synchronization snapshot 416) to indicate that the replication of the least recent snapshot to target array 450 is complete.

In examples in which multiple user-initiated snapshots exist, replication engine 150 may iteratively identify the next least recent pending snapshot, compute the data delta between the least recent pending snapshot and the most recent completed snapshot, replicate the data delta to the target array, and update the pending status of the least recent pending snapshot to indicate completion until each pending snapshot has been updated to the completed status. Once each snapshot has been replicated and updated to have the completed status, replication engine 150 may mark synchronization snapshot 416 as the resynchronization snapshot for a next periodic replication. In some examples, this may involve, flagging, tagging, or otherwise indicating that synchronization snapshot 416 should be relied upon as the resynchronization snapshot at a next periodic replication time. This indication may be done in the original snapshot list.

In some examples, receive engine 110 may receive a user snapshot request to create a user-initiated snapshot, wherein the user-initiated snapshot is an RW snapshot. Creation engine 120 may create the user-initiated RW snapshot, associate an RW replication object with the user-initiated RW snapshot, and add the RW replication object to the replication group. The RW replication object identifies the user-initiated RW snapshot with the source array. In such examples, synchronization engine 130 creates a synchronization snapshot of the user-initiated RW snapshot at a same periodic synchronization time as synchronization snapshots are created of the other volumes within the replication group. Creation engine 120 additionally creates a system-initiated RO snapshot of the volume at the time the user-initiated RW snapshot is created. The system-initiated RO snapshot may also be associated with a replication object and added to the replication group.

Figure 5:
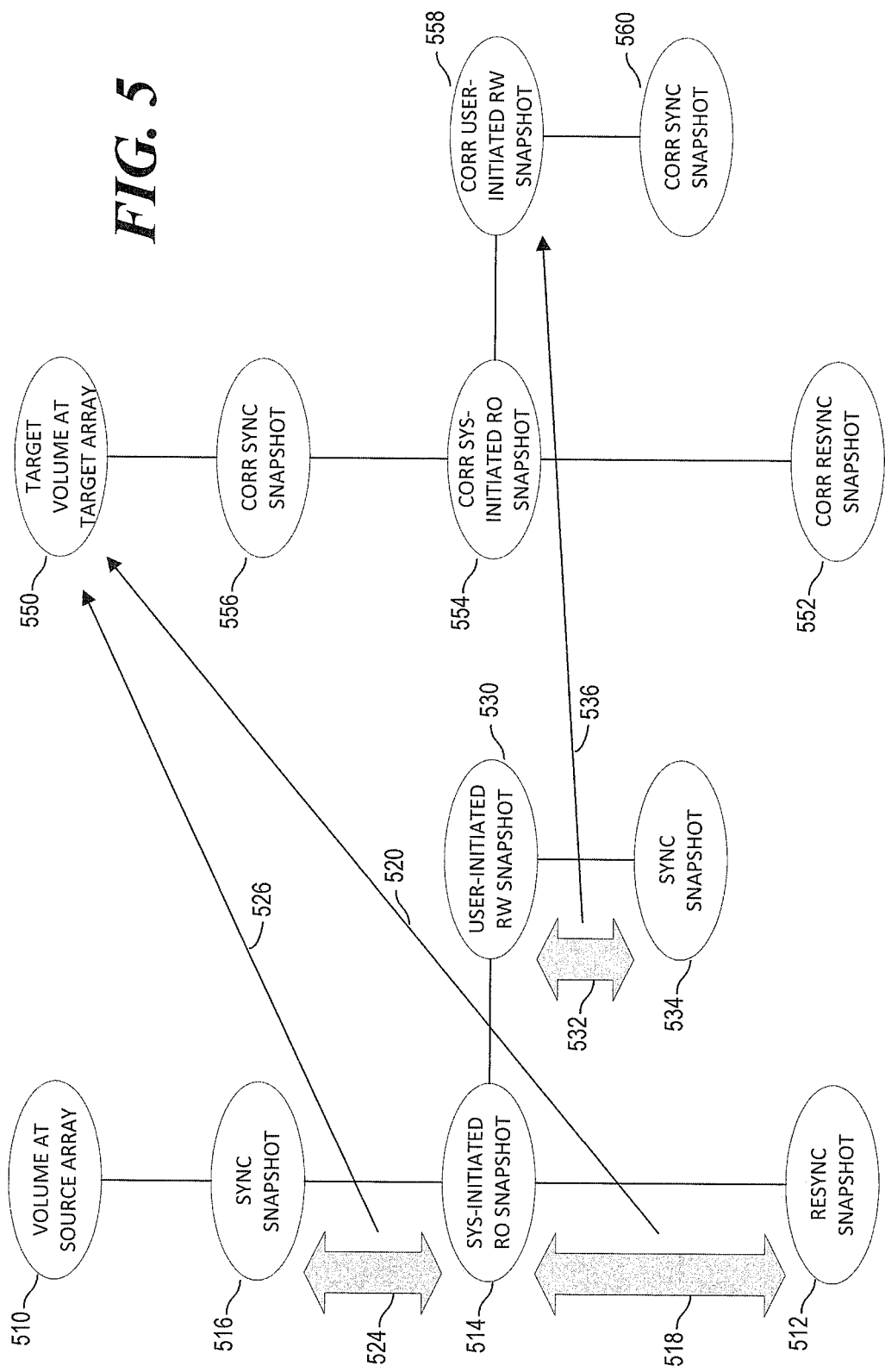

In some such examples, replication engine 150 may incrementally replicate the volume at the source array to the target array as depicted in FIG. 5. FIG. 5 illustrates a flow diagram of an example incremental replication of the volume at source array 510 to a target volume of target array 550 (referred to herein as either target array 550 or target volume of target array 550) via a user-initiated RW snapshot and a system-initiated RO snapshot. Although replication engine 150 is described below with reference to FIG. 5, other suitable configurations and examples may also apply.

FIG. 5 depicts performance of a first incremental replication based on system-initiated RO snapshot 514 such that target array 550 has a replica of a first portion of the volume associated with system-initiated RO snapshot 514. Replication engine 150 identifies, in chronological order beginning with a least recent (i.e., the oldest), each pending snapshot that is associated with the system-initiated RO snapshot. In the example of FIG. 5, the least recent pending snapshot associated with the system-initiated RO snapshot, is the system-initiated RO snapshot 514 itself.

Based (at least in part) on identifying the least recent pending snapshot, replication engine 150 may compute the data delta between the least recent pending snapshot that is associated with the system-initiated RO snapshot (system-initiated RO snapshot 514 itself) and a most recent completed snapshot that is associated with the system-initiated RO snapshot (resynchronization snapshot 512). In the example of FIG. 5, the most recent completed snapshot is resynchronization snapshot 512. Data delta 518 may be computed by comparing differences between system-initiated RO snapshot 514 and resynchronization snapshot 512. Resynchronization snapshot 512 may provide the delta base for the data delta computation.

Replication engine 150 may replicate data delta 518 to target array 550, as shown by arrow 520. This brings a target volume at target array 550 to the same image as system-initiated RO snapshot 514. Once data delta 518 has been replicated to target array 550, request engine 160 requests creation of a corresponding snapshot at the target array. In some examples, the corresponding snapshot may be created, stored, and recorded in a recreated snapshot list at the target array. Corresponding system-initiated RO snapshot 554 at target array 450 is the corresponding least recent snapshot. In some examples, target array 450 may send source array 410 a message indicating that the corresponding least recent snapshot has been created.

After creation of the corresponding system-initiated RO snapshot 554 at the target array, replication engine 150 updates the pending status of the least recent snapshot (i.e., the system-initiated RO snapshot 554) to indicate that the replication of the least recent snapshot to target array 550 is complete.

In some examples, when request engine 160 requests creation of a corresponding system-initiated RO snapshot 554 at target array 550, request engine 160 also requests creation of a corresponding user-initiated RW snapshot at the target array. The corresponding snapshot may be created, stored, and recorded in a recreated snapshot list at the target array. In some examples, target array 450 may send source array 410 a message indicating that the corresponding user-initiated RW snapshot 558 has been created. Replication engine 150 may update the pending status of user-initiated RW snapshot 530 after creation of corresponding user-initiated RW snapshot 558 to indicate that the replication of user-initiated RW snapshot 530 is complete.

In examples in which multiple snapshots associated with system-initiated RO snapshot 514 exist, replication engine 150 may iteratively identify the next least recent pending snapshot, compute the data delta between the least recent pending snapshot and the most recent completed snapshot, replicate the data delta to the target array, and update the pending status of the least recent pending snapshot to indicate completion until each pending snapshot has been updated to the completed status. Once each snapshot associated with the system-initiated RO snapshot has a completed status, replication engine 150 may mark synchronization snapshot 516 as a resynchronization snapshot associated with the system-initiated RO snapshot for use in a next periodic replication.

In the example of FIG. 5, replication engine 150 may identify a next least recent pending snapshot associated with the system-initiated RO snapshot, which is synchronization snapshot 516. Based (at least in part) on identifying the next least recent pending snapshot, replication engine 150 may compute data delta 524 between the next least recent pending snapshot (synchronization snapshot 516) and a most recent completed snapshot (system-initiated RO snapshot 514).

Replication engine 150 replicates data delta 524 to target array 550, as shown by arrow 526. This brings a target volume at target array 550 to the same image as synchronization snapshot 516. Once data delta 524 has been replicated to target array 550, request engine 160 requests creation of a corresponding least recent snapshot at the target array. In some examples, the corresponding snapshot may be created, stored, and recorded in a recreated snapshot list at the target array. Corresponding synchronization snapshot 556 at target array 550 is the corresponding least recent snapshot. In some examples, target array 550 may send source array 510 a message indicating that the corresponding least recent snapshot has been created. After the creation of this corresponding snapshot at the target array, replication engine 150 updates the pending status of the least recent snapshot (synchronization snapshot 516) to indicate that the replication of the least recent snapshot to target array 550 is complete.

Once each snapshot associated with the system-initiated RO snapshot has been replicated and updated to have the completed status, replication engine 150 may mark synchronization snapshot 516 associated with the system-initiated RO snapshot as the resynchronization snapshot associated with the system-initiated RO snapshot for a next periodic replication.

In addition to the first incremental replication, FIG. 5 also depicts performance of a second incremental replication based on user-initiated RW snapshot 530 such that target array 550 has a replica of a second portion of the volume associated with user-initiated RW snapshot 530. Replication engine 150 identifies, in chronological order beginning with a least recent (i.e., the oldest) a pending snapshot that is associated with the user-initiated RW snapshot. In the example of FIG. 5, the least recent pending snapshot associated with the system-initiated RW snapshot is synchronization snapshot 534.

Based (at least in part) on identifying the least recent pending snapshot, replication engine 150 may compute data delta 532 between the least recent pending snapshot (synchronization snapshot 534) and a most recent completed snapshot associated with user-initiated RW snapshot (user-initiated RW snapshot 530).

Replication engine 150 replicates data delta 532 to target array 550, as shown by arrow 536. This brings a target volume at target array 550 to the same image as synchronization snapshot 534. Once data delta 532 has been replicated to target array 550, request engine 160 requests creation of a corresponding least recent snapshot at the target array. The corresponding snapshot may be created, stored, and recorded in a recreated snapshot list at the target array. Corresponding synchronization snapshot 560 at target array 550 is the corresponding least recent snapshot. In some examples, target array 550 may send source array 510 a message indicating that the corresponding least recent snapshot has been created. After the creation of this corresponding snapshot at the target array, replication engine 150 updates the pending status of the least recent snapshot (synchronization snapshot 534) to indicate that the replication of the least recent snapshot to target array 550 is complete.

In examples in which multiple snapshots associated with user-initiated RW snapshot 530 exist, replication engine 150 may iteratively identify the next least recent pending snapshot, compute the data delta between the least recent pending snapshot and the most recent completed snapshot, replicate the data delta to the target array, and update the pending status of the least recent pending snapshot to indicate completion until each pending snapshot has been updated to the completed status. Once each snapshot associated with the user-initiated RW snapshot has a completed status, replication engine 150 may mark synchronization snapshot 534 as a resynchronization snapshot associated with the user-initiated RW snapshot for use in a next periodic replication.

In some examples, receive engine 110 may receive a user deletion request to delete a user-initiated snapshot, such as user-initiated RO snapshot 414 of FIG. 4 or user-initiated RW snapshot 530 of FIG. 5. For instance, the user may generate and send the user deletion request to device 105 via a user interface at the source array. In the example of FIG. 1B, in response to receiving the user deletion request, deletion engine 170 of device 105 may delete the user-initiated snapshot from the source array and from the original snapshot list at the source array. Request engine 160 may request deletion of a corresponding user-initiated snapshot from the target array and the recreated snapshot list at the target array.

In other examples, synchronization engine 130 may create a subset of synchronization snapshots at the periodic synchronization time based (at least in part) on a user-defined subset of the set of volumes in the replication group. In some examples, receive engine 110 may receive a user message identifying the subset of the volumes that should be periodically replicated together. Replicating certain subsets or groups of volumes together may further data consistency. Accordingly, replication engine 150 may incrementally replicate the subset of volumes to the target array such that the target array has a replica of the subset of volumes at the source array.

In yet other examples, receive engine 110 may receive an addition request to add a new volume at the source array to the set of volumes in the replication group. In some examples, this request may be received from a user via a user interface. The new volume may include a set of existing snapshots to be added to the replication group based on a user selection of the existing snapshots. These existing snapshots may be previous snapshots of the new volume, created before the new volume was added to the replication group. A user may select some, all, or none of the existing snapshots via a user interface, for instance, to add to the replication group.

In response to the addition request, synchronization engine 130 may add the new volume to the replication group and may create a new synchronization snapshot of the new volume at the periodic synchronization time, along with creating synchronization snapshots of the other volumes within the replication group. The new synchronization snapshot may be set to have a pending status.

Storage engine 140 may store each new snapshot of the new volume, wherein each new snapshot includes the user selected existing snapshots. A new snapshot, as used in the examples herein, may refer to a snapshot associated with the new volume. Storage engine 140 may also record each new snapshot via a new representative entry in a new original snapshot list at the source array. The new representative entry and the new original snapshot list, as used in the examples herein, may refer to a representative entry and an original snapshot list, respectively, that are associated with the new volume at the source array.

Replication engine 150 may incrementally replicate the new volume to the target array such that the target array has a replica of the new volume at the source array. In some examples, a new volume may include a set of existing previous snapshots. Based on a user selection of the set of existing snapshots, the user-selected existing snapshots may be incrementally replicated to the target array. In other examples, a new volume may be added that includes no existing snapshots. Accordingly, the new synchronous snapshot may include all the data in the new volume and replication of the new synchronous snapshot to the target array may replicate all data within the new volume.

Request engine 160 may request creation of a corresponding new snapshot at the target array after each incremental replication of the new volume such that each new snapshot recorded in the new original snapshot list is recreated and stored at the target array and the new original snapshot list is recreated as a new recreated snapshot list at the target array. The new original snapshot list and the new recreated snapshot list may include new representative entries for the user selected existing snapshots created before the volume was added to the replication group.

Figure 2A:
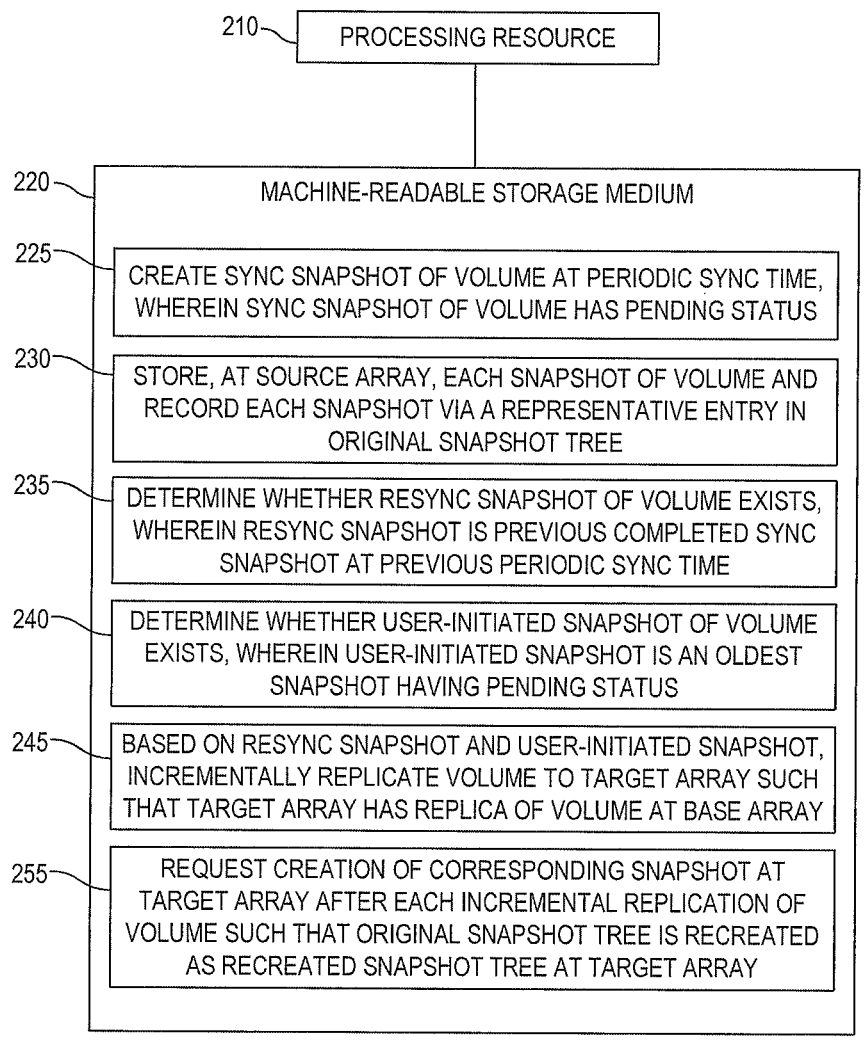
FIGS. 2A and 2B are block diagrams of example machine-readable storage mediums that include instructions to replicate a volume at a source array to a target array such that the target array has a replica of the volume at the source array and a recreated snapshot list.
Figure 2B:
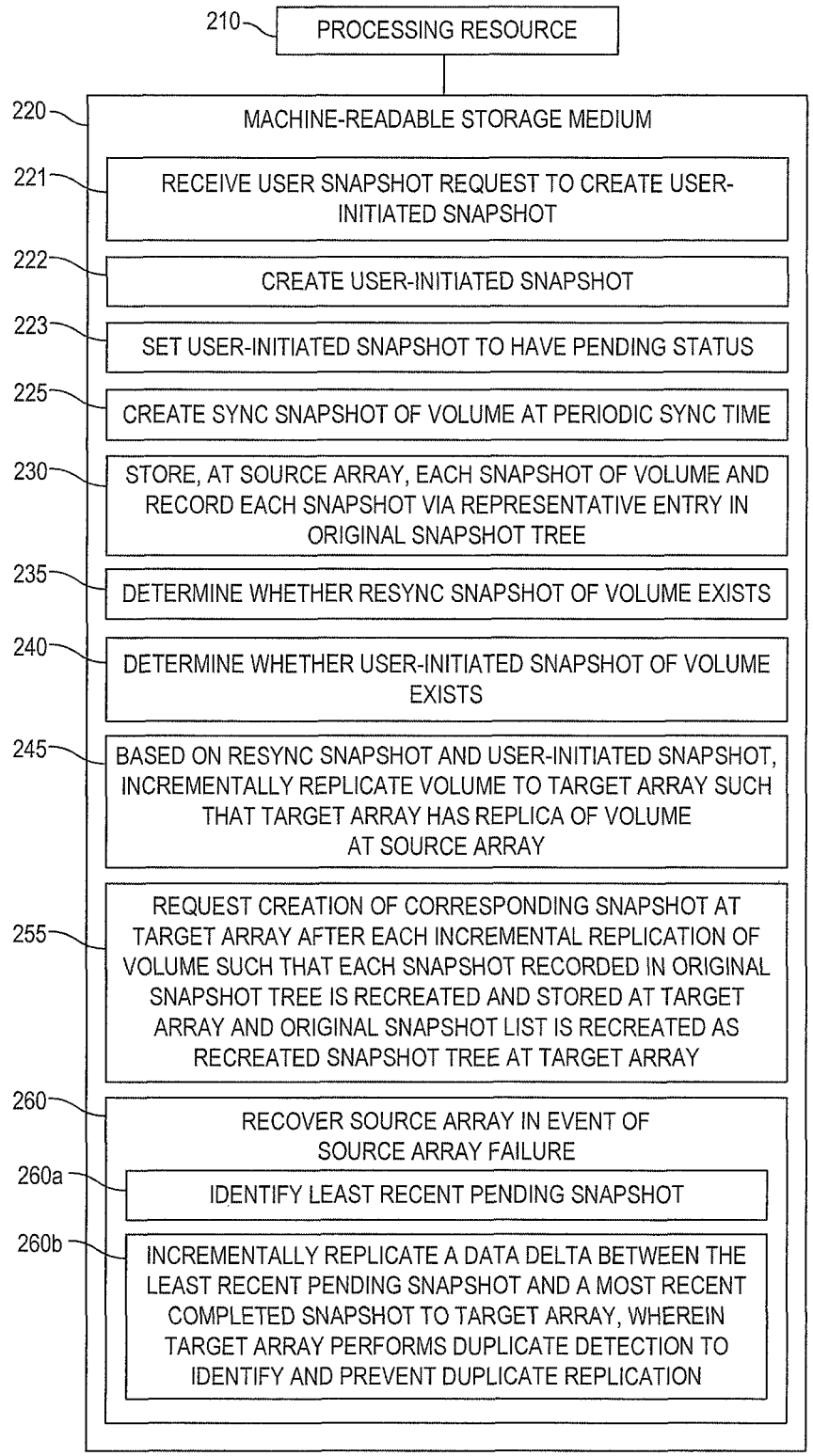
Figure 2C:
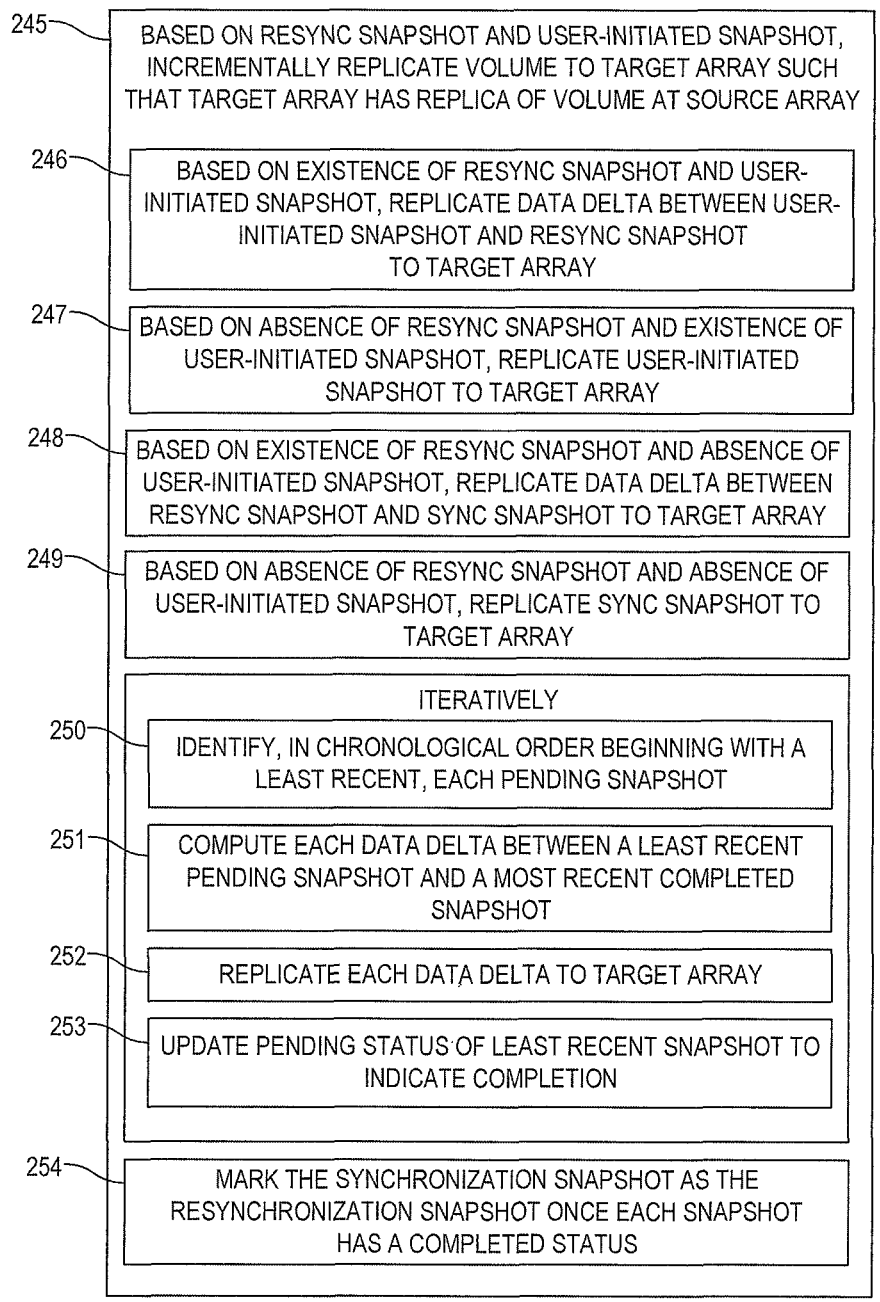
FIG. 2C is a block diagram of example instructions to incrementally replicate the volume at the source array to the target array.

Further examples are described herein in relation to FIGS. 2A-2C. FIG. 2A depicts a block diagram of an example machine-readable storage medium 220 that includes instructions to replicate a volume at a source array to a target array such that the target array has a replica of the volume at the source array and a recreated snapshot list. The instructions may be executable by a processing resource 110.

As depicted in FIG. 2A, machine-readable storage medium 220 comprises (e.g., is encoded with) instructions 225, 230, 235, 240, 245, and 255 executable by processing resource 210 to implement functionalities described herein in relation to FIG. 2A. In some examples, storage medium 220 may include additional instructions. In other examples, the functionalities described herein in relation to instructions 225, 230, 235, 240, 245, 255, and any additional instructions described herein in relation to storage medium 220, may be implemented at least in part in electronic circuitry (e.g., via components comprising any combination of hardware and programming to implement the functionalities described herein).

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 210 may fetch, decode, and execute instructions stored on storage medium 120 to perform the functionalities described above in relation to instructions 225, 230, 235, 240, 245, and 255. In other examples, the functionalities of any of the instructions of storage medium 220 may be implemented in the form of electronic circuitry, in the form of executable instructions encoded on a machine-readable storage medium, or a combination thereof. In the example of FIG. 2A, storage medium 220 may be implemented by one machine-readable storage medium, or multiple machine-readable storage media.

In the example of FIG. 2A, instructions 225 may create a synchronization snapshot of a volume at a periodic synchronization time, as described above in relation to synchronization engine 130 of FIG. 1. The synchronization snapshot of the volume may be set to have a pending status. Instructions 230 may store each snapshot of the volume and record each snapshot via a representative entry in an original snapshot list at the source array, as described above in relation to storage engine 140 of FIG. 1. In some examples, the status of the snapshot may be stored in persistent memory such that replication can continue unimpeded in the event of a failure.

Instructions 235 may determine whether a resynchronization snapshot of the volume exists. The resynchronization snapshot is a previous synchronization snapshot at a previous periodic synchronization time having a completed status. In some examples, this determination may be made by reviewing the original snapshot list at the source array to determine whether a resynchronization snapshot exists. Instructions 240 may determine whether a user-initiated snapshot of the volume exists. The user-initiated snapshot may, in some examples, be the oldest snapshot having a pending status. In some examples, this determination may be made by reviewing the original snapshot list at the source array to determine whether a resynchronization snapshot exists. The user-initiated snapshot may be a RO snapshot or a RW snapshot.

As described above in relation to replication engine 150 of FIG. 1, instructions 245 incrementally replicate the volume to the target array such that the target array has a replica of the volume at the source array, based (at least in part) on the resynchronization snapshot and the user-initiated snapshot. In some examples, instructions 245 may further include instructions 246, 247, 248, 249, 250, 252, 253, and 254, as depicted in FIG. 2C.

Turning to FIG. 2C, instructions 246 replicate a data delta between the user-initiated snapshot and the resynchronization snapshot to the target array based (at least in part) on the existence of the resynchronization snapshot and the existence of the user-initiated snapshot. For instance, as described above in relation to FIG. 4, data delta 418 between user-initiated RO snapshot 414 and resynchronization snapshot 412 is replicated to target array 450. In the example of FIG. 4, user-initiated RO snapshot 414 was an oldest pending snapshot at source array 410.

Instructions 247 of FIG. 2C replicate the user-initiated snapshot to the target array based (at least in part) on the absence of the resynchronization snapshot and the existence of the user-initiated snapshot. In some such examples, the absence of the resynchronization snapshot may mean that the original snapshot list contains no completed snapshots. If the oldest snapshot is the user-initiated snapshot, the user-initiated snapshot may include all the data in the volume. Accordingly, incremental replication may involve replicating the user-initiated snapshot to the target array.

Instructions 248 of FIG. 2C replicate a data delta between the resynchronization snapshot and the synchronization snapshot to the target array based (at least in part) on the existence of the resynchronization snapshot and the absence of the user-initiated snapshot. In such an example, the resynchronization snapshot is a most recent status having a completed status and the synchronization snapshot is a least recent snapshot having a pending status and replication occurs as described above in relation to replication engine 150 of FIG. 1.

Instructions 249 of FIG. 2C replicate the synchronization snapshot to the target array based (at least in part) on the absence of the resynchronization snapshot and the absence of the user-initiated snapshot. In such an example, the original snapshot list may contain no completed snapshots and also does contain a user-initiated snapshot. Thus, the original snapshot list may include the synchronization snapshot alone. The synchronization snapshot may include all the data in the volume and incremental replication may involve replicating the synchronization snapshot to the target array.

In examples in which multiple pending snapshots exist, instructions 250 may identify, in chronological order beginning with a least recent, each snapshot having a pending status, as described above in relation to replication engine 150 of FIG. 1. Instructions 251 may compute each data delta between a least recent snapshot having a pending status and a most recent snapshot having a completed status, as described above in relation to replication engine 150 of FIG. 1. Instructions 252 may replicate each data delta to the target array, as described above in relation to replication engine 150 of FIG. 1. Instructions 253 may then update the pending status of the least recent snapshot to indicate completion after a corresponding least recent snapshot has been created at the target array. Instructions 250, 251, 252, and 253 may iteratively execute until the target array has a replica of the volume at the source array. Instructions 254 mark the synchronization snapshot as the resynchronization snapshot once each snapshot has a completed status, as described above in relation to replication engine 150 of FIG. 1.

Returning again to FIG. 2A, instructions 255 may request creation of a corresponding snapshot at the target array after each incremental replication of the volume such each snapshot recorded in the original snapshot list is recreated and stored at the target array and the original snapshot list is recreated as a recreated snapshot list at the target array, as described above in relation to request engine 160.

In some examples, instructions 225, 230, 235, 240, 245, and 255 may be part of an installation package that, when installed, may be executed by processing resource 210 to implement the functionalities described above. In such examples, storage medium 220 may be a portable medium, such as a CD, DVD, or flash drive, or a memory maintained by a server from which the installation package can be downloaded and installed. In other examples, instructions 225, 230, 235, 240, 245, and 255 may be part of an application, applications, or component(s) already installed on a device, such as device 100, that includes a processing resource. In such examples, the storage medium 220 may include memory such as a hard drive, solid state drive, or the like. In some examples, functionalities described herein in relation to FIG. 2A may be provided in combination with functionalities described herein in relation to any of FIGS. 1, 2B-2C and 3-5.

Further examples are described herein in relation to FIG. 2B, which is a block diagram of an example machine-readable storage medium 220 that includes instructions to replicate a volume at a source array to a target array such that the target array has a replica of the volume at the source array and a recreated snapshot list. The example of FIG. 1B includes processing resource 210, and machine-readable storage medium 220 comprising instructions 225, 230, 235, 240, 245, and 255, as described above in relation to FIG. 2A. The example of FIG. 2B further includes the machine-readable storage medium 220 comprising instructions 221, 222, 223, and 260 executable by processing resource 210 to implement functionalities described herein in relation to FIG. 1B.

In some examples, storage medium 220 may include additional instructions. In other examples, the functionalities described herein in relation to instructions 221, 222, 223, 225, 230, 235, 240, 245, 255, 260, and any additional instructions described herein in relation to storage medium 220, may be implemented at least in part in electronic circuitry (e.g., via components comprising any combination of hardware and programming to implement the functionalities described herein).

Processing resource 210 may fetch, decode, and execute instructions stored on storage medium 220 to perform the functionalities described above in relation to instructions 221, 222, 223, 225, 230, 235, 240, 245, 255, and 260. In other examples, the functionalities of any of the instructions of storage medium 220 may be implemented in the form of electronic circuitry, in the form of executable instructions encoded on a machine-readable storage medium, or a combination thereof. In the example of FIG. 2B, storage medium 220 may be implemented by one machine-readable storage medium, or multiple machine-readable storage media.

Instructions 221 receive a user snapshot request to create the user-initiated snapshot, as described above in relation to receive engine 110 of FIG. 1. Instructions 222 create the user-initiated snapshot, as described above in relation to creation engine 120 of FIG. 1. The user-initiated snapshot may be a RO snapshot or a RW snapshot. Instructions 223 set the user-initiated snapshot to have the pending status, as discussed above in relation to creation engine 120 of FIG. 1. The functionalities of instructions 225, 230, 235, 240, 245, and 255 of FIG. 2B are described above in relation to FIG. 2A.

Instructions 260 may recover the source array in the event of a source array failure. In some examples, instructions 260 may additionally comprise instructions 260a and 260b. When the source array fails, instructions 260a may identify a least recent pending snapshot to continue replication to the target array. In some examples, identifying the least recent pending snapshot may involve recovering the statuses of the snapshots from a persistent store and determining the oldest snapshot that is still pending. Instructions 260b may then incrementally replicate the data delta between the least recent pending snapshot and a most recent completed snapshot to the target array. The target array may perform a duplicate detection to identify whether the data delta was previously duplicated and prevent a duplicate replication. In examples that include multiple pending snapshots, instructions 260a and 260b may iterate until each pending snapshot has been updated to a completed status.

In some examples, instructions 221, 222, 223, 225, 230, 235, 240, 245, 255, and 260 may be part of an installation package that, when installed, may be executed by processing resource 210 to implement the functionalities described above. In such examples, storage medium 220 may be a portable medium, such as a CD, DVD, or flash drive, or a memory maintained by a server from which the installation package can be downloaded and installed. In other examples, instructions 221, 222, 223, 225, 230, 235, 240, 245, 255, and 260 may be part of an application, applications, or component(s) already installed on a device, such as device 100, that includes a processing resource. In such examples, the storage medium 220 may include memory such as a hard drive, solid state drive, or the like. In some examples, functionalities described herein in relation to FIG. 2B may be provided in combination with functionalities described herein in relation to any of FIGS. 1, 2A, 2C and 3-5.

Figure 3A:
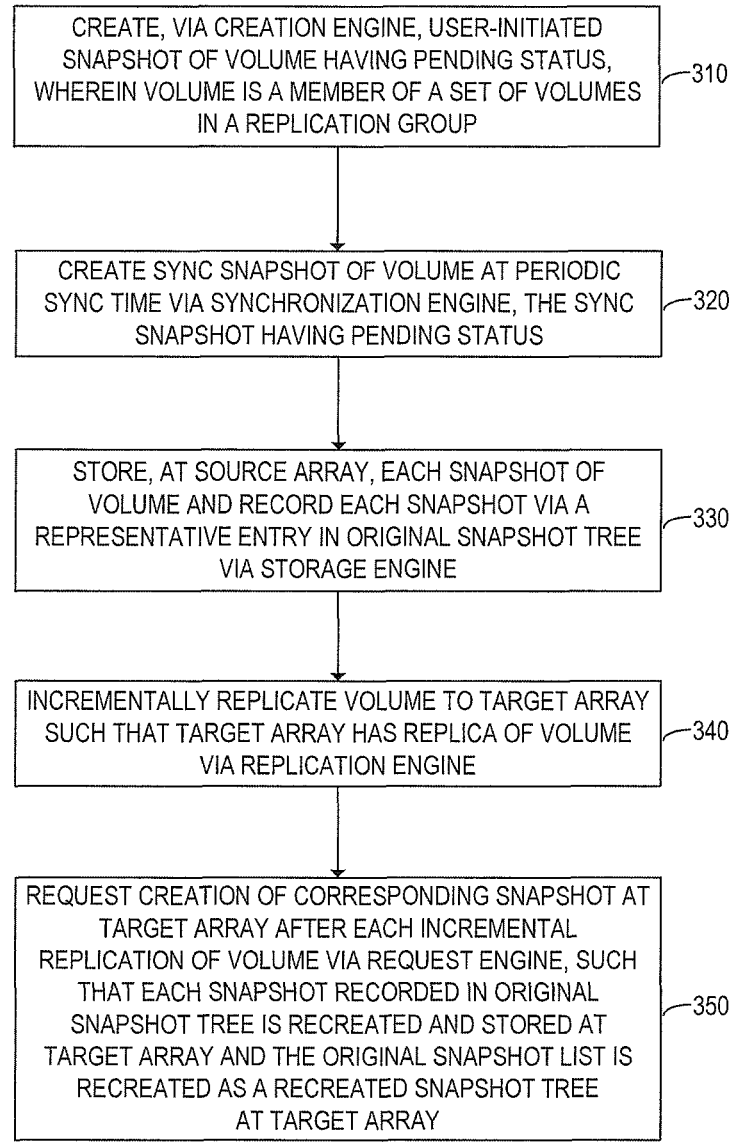
FIG. 3A is a flowchart of an example method of replicating a volume at a source array to a target array such that the target array has a replica of the volume at the source array and a recreated snapshot list.

FIG. 3A is a flowchart of an example method 300 for replicating a volume of a source array to a target array. Although execution of method 300 is described below with reference to devices 100 and 105 of FIGS. 1A and 1B, other suitable devices for the execution of method 300 can be utilized. Additionally, implementation of method 300 is not limited to such examples.

At 310 of method 300, creation engine 120 may create a user-initiated snapshot of the volume having a pending status, as described above in relation to creation engine 120 of FIG. 1A. The volume may be a member of a set of volumes in a replication group. The user-initiated snapshot may be an RO snapshot or an RW snapshot. At 320, synchronization engine 130 may create a synchronization snapshot of the volume at a periodic sync time, as described above in relation to synchronization engine 130 of FIG. 1A. At 330, storage engine 140 may store, at the source array, each snapshot of the volume and record each snapshot via a representative entry in an original snapshot list, as described above in relation to storage engine 140 of FIG. 1A.

Figure 3B:
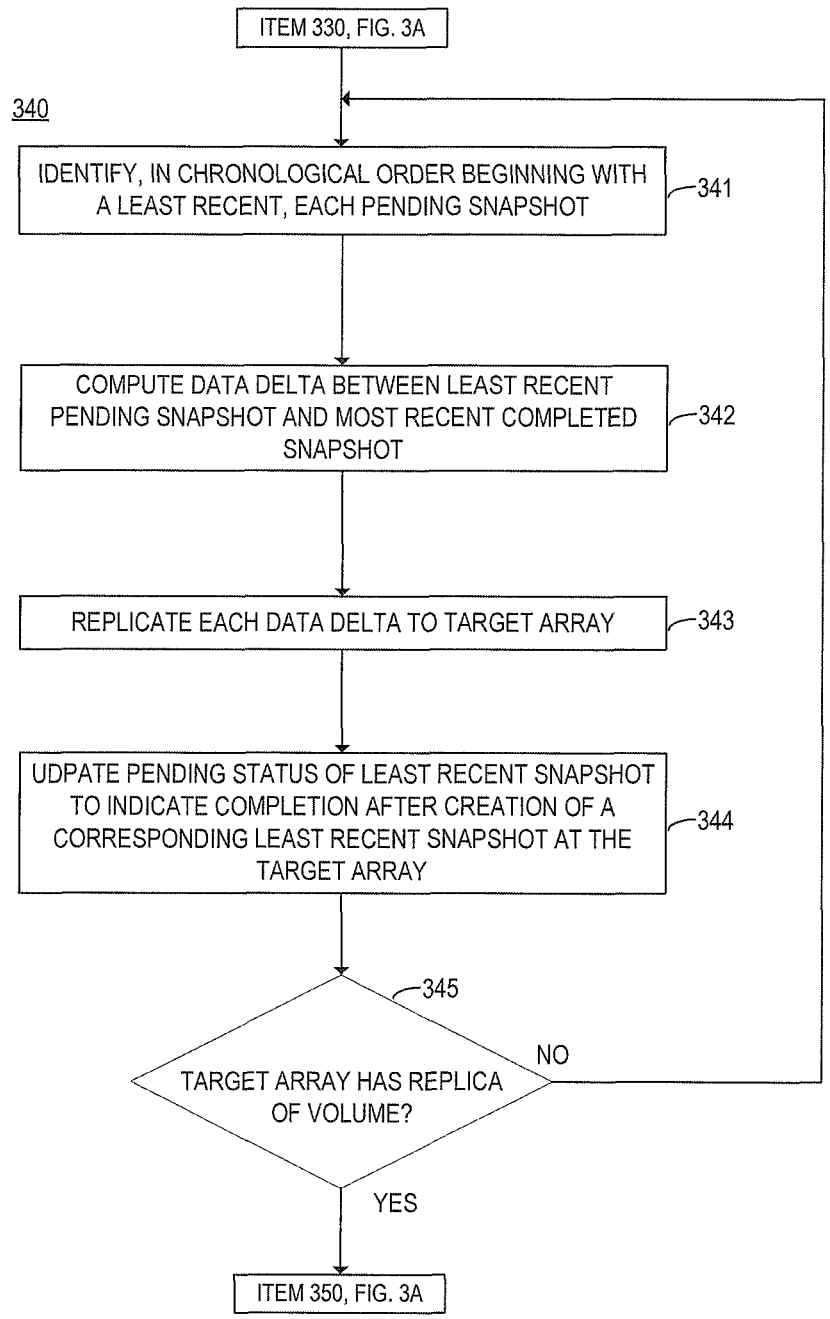
FIG. 3B is a flowchart of an example method of incrementally replicating a volume.

At 340, replication engine 150 may incrementally replicate the volume to the target array such that the target array has a replica of the volume at the source array, as described above in relation to replication engine 150 of FIG. 1A. In some examples, in which the user-initiated snapshot is an RO snapshot, 340 may additionally comprise 341, 342, 343, 344, and 345, as depicted in FIG. 3B. At 341, replication engine 150 may identify, in chronological order beginning with a least recent, each pending snapshot, as described above in relation to replication engine 150 of FIG. 1B. At 342, replication engine 150 may compute a data delta between a least recent snapshot having a pending status and a most recent snapshot having a completed status, as described above in relation to replication engine 150 of FIG. 1B. At 343, replication engine 150 may replicate each data delta to the target array, as described above in relation to replication engine 150 of FIG. 1B. At 344, replication engine 150 may update the pending status of the least recent snapshot to indicate completion after creation of a corresponding least recent snapshot at the target array, as described above in relation to replication engine 150 of FIG. 1B. At 345, if the target array does not have a replica of the volume at the source array (as the volume was at the periodic replication time), method 340 returns to 341 to iterate. If the target array does have a replica of the volume at the source array, the method proceeds to 350.

At 350, request engine 160 may request creation of a corresponding snapshot at the target array after each incremental replication of the volume such that each snapshot recorded in the original snapshot list is recreated and stored at the target array and the original snapshot list is recreated as a recreated snapshot list at the target array, as described above in relation to request engine 160 of FIG. 1A.

Although the flowchart of FIG. 3A shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3A may be provided in combination with functionalities described herein in relation to any of FIGS. 1-2, 3B-D, and 4-5.

Figure 3C:
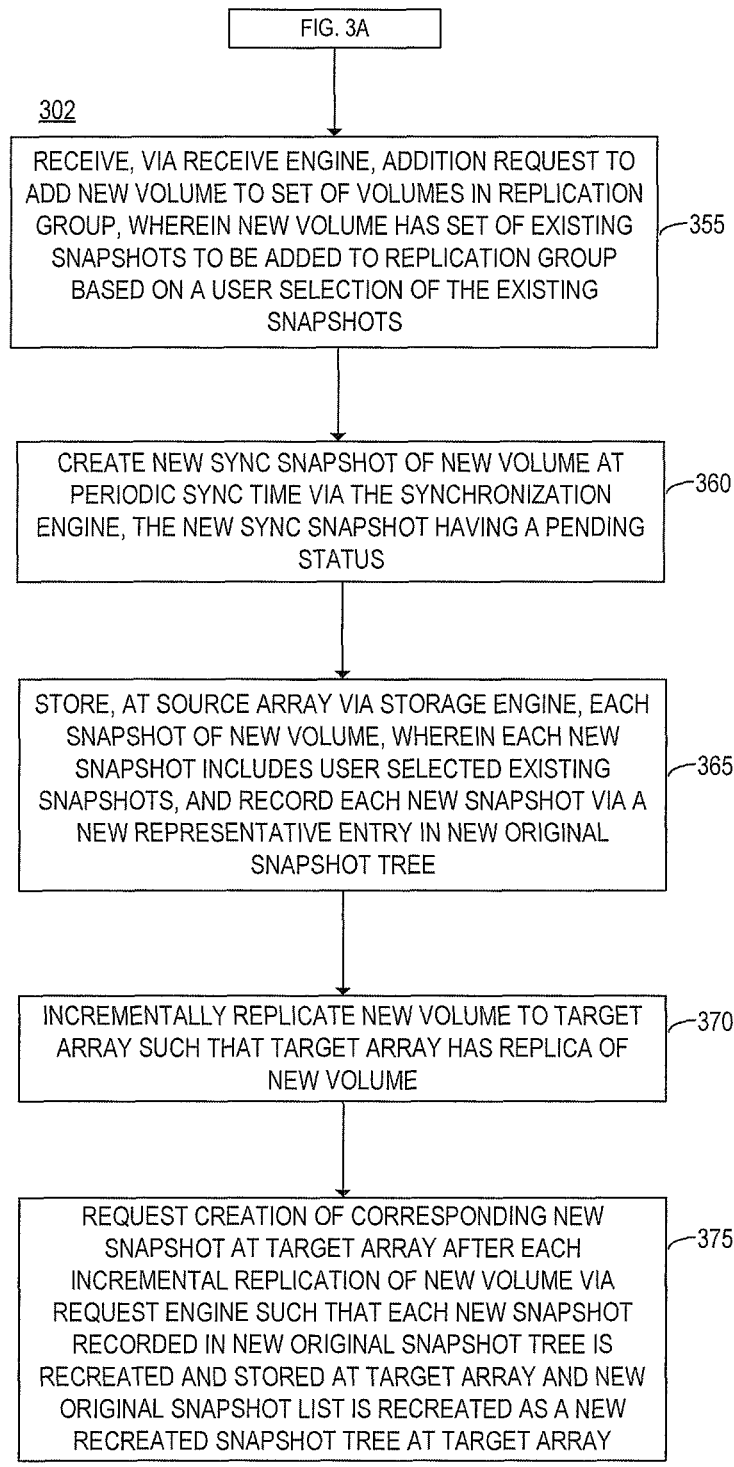
FIG. 3C is a flowchart of an example method of adding a new volume to a set of volumes in a replication group.

FIG. 3C is a flowchart of an example method 302 for replicating a volume of a source array to a target array that may follow method 300 of FIG. 3A. Although execution of method 302 is described below with reference to device 105 of FIG. 1B, other suitable devices for the execution of method 302 can be utilized. Additionally, implementation of method 302 is not limited to such examples.

At 355, receive engine 110 may receive an addition request to add a new volume to the set of volumes in the replication group, as described above in relation to receive engine 110 of FIG. 1B. The new volume may include a set of existing snapshots to be added to a replication group based on a user selection of the existing snapshots. At 360, synchronization engine 130 may create a new synchronization snapshot of the new volume at the periodic synchronization time, as described above in relation to synchronization engine 130 of FIG. 1B.

At 365, storage engine 140 may store each new snapshot of the new volume, wherein each new snapshot includes the user selected existing snapshots, and record each new snapshot via a new representative entry in a new original snapshot list at the source array, as described above in relation to storage engine 140 of FIG. 1B. At 370, replication engine 150 may incrementally replicate the new volume to the target array such that the target array has a replica of the new volume, as described above in relation to replication engine 150 of FIG. 1B. At 375, request engine 160 may request creation of a corresponding new snapshot at the target array after each incremental replication of the new volume such that each new snapshot recorded in the new original snapshot tree is recreated and stored at the target array and the new original snapshot list is recreated as a new recreated snapshot tree at the target array, as described above in relation to request engine 160 of FIG. 1B.

Although the flowchart of FIG. 3C shows a specific order of performance of certain functionalities, method 302 is not limited to that order. For example, the functionalities shown in succession in the flowchart may be performed in a different order, may be executed concurrently or with partial concurrence, or a combination thereof. In some examples, functionalities described herein in relation to FIG. 3C may be provided in combination with functionalities described herein in relation to any of FIGS. 1-2, 3A-B, 3D, and 4-5.

Figure 3D:
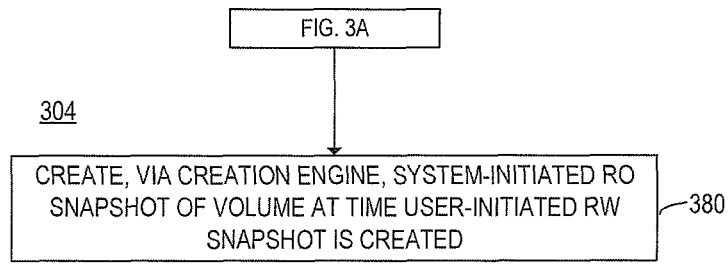
FIGS. 3D and 3E are flowcharts of example methods of replicating a volume at a source array to a target array via a user-initiated read-write snapshot.
Figure 3E:
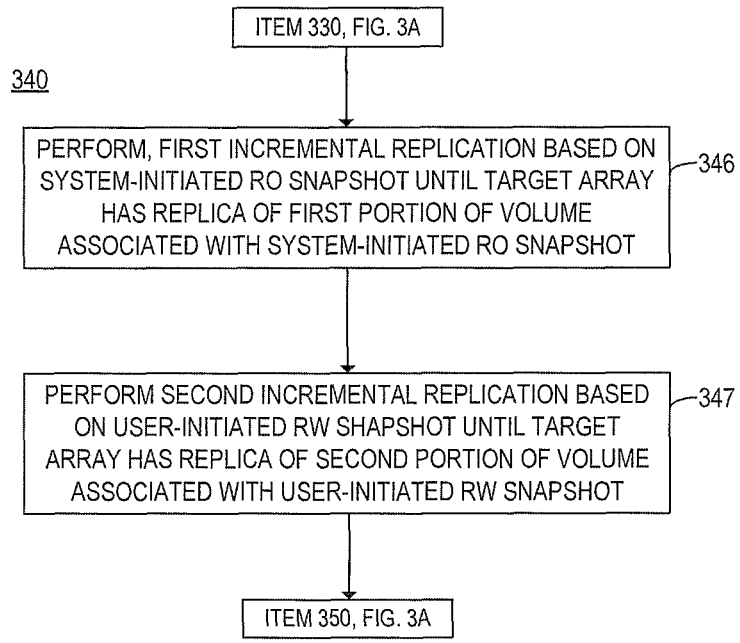

FIGS. 3D and 3E are flowcharts of example methods that relate to the user-initiated snapshot being an RW snapshot. FIG. 3D is a flowchart of an example method 304 for replicating a volume of a source array to a target array when the user-initiated snapshot is an RW snapshot. In some examples, method 304 may be executed concurrently, with partial concurrence, before, or after, portions of method 300 of FIG. 3A. Although execution of method 304 is described below with reference to devices 100 and 105 of FIGS. 1A and 1B, other suitable devices for the execution of method 304 can be utilized. Additionally, implementation of method 304 is not limited to such examples.

In some examples, the user-initiated snapshot may be an RW snapshot. At 380, creation engine 120 may create a system-initiated RO snapshot of the volume at the time the user-initiated RW snapshot is created, as described above in relation to creation engine 120 of FIG. 1. The functionalities described herein in relation to FIG. 3D may be provided in combination with functionalities described herein in relation to any of FIGS. 1-2, 3A-C, and 4-5.

FIG. 3E is a flowchart of an example method 304 for performing incremental replication when the user-initiated snapshot is an RW snapshot. In some examples, in which the user-initiated snapshot is an RW snapshot, 340 may additionally comprise 346 and 347, as depicted in FIG. 3E. At 346, replication engine 150 performs a first incremental replication based on the system-initiated RO snapshot until the target array has a replica of a first portion of the volume associated with the system-initiated RO snapshot, as described above in relation to replication engine 150 of FIG. 1B. At 347, replication engine 150 performs a second incremental replication based on the user-initiated RW snapshot until the target array has a replica of a second portion of the volume associated with the user-initiated RW snapshot, as described above in relation to replication engine 150 of FIG. 1B.

Although the flowchart of FIG. 3E shows a specific order of performance of certain functionalities, method 340 is not limited to that order. For example, the functionalities shown in succession in the flowchart may be performed in a different order, may be executed concurrently or with partial concurrence, or a combination thereof. In some examples, functionalities described herein in relation to FIG. 3E may be provided in combination with functionalities described herein in relation to any of FIGS. 1-2, 3A-D, and 4-5.

What is claimed is:

1. A device comprising:
    a processing resource; and
    a non-transitory machine-readable storage medium comprising instructions executable by the processing resource to:
        receive a request to create a user-initiated read-write (RW) snapshot of a volume at a source array;
        create the user-initiated RW snapshot of the volume, the user-initiated RW snapshot having a pending status;
        create a system-initiated read-only (RO) snapshot of the volume at the time the user-initiated RW snapshot is created;
        store, at the source array, each snapshot of the volume and record each snapshot via a representative entry in an original snapshot list;
        perform a first incremental replication of a first portion of the volume from the source array to the target array, based on the system-initiated RO snapshot, such that the target array has a replica of the first portion of the volume associated with the system-initiated RO snapshot;
        perform a second incremental replication of a second portion of the volume from the source array to the target array, based on the user-initiated RW snapshot, such that the target array has a replica of the second portion of the volume associated with the user-initiated RW snapshot; and
        request creation of a corresponding RW snapshot, corresponding to the user-initiated RW snapshot, at the target array after the first incremental replication of the first portion of the volume.

2. The device of claim 1, the instructions comprising instructions executable by the processing resource to:
    receive a user deletion request to delete the user-initiated snapshot RW;
    delete the user-initiated snapshot RW from the source array and from the original snapshot list at the source array; and
    request deletion of the corresponding user-initiated RW snapshot from the target array and from a recreated snapshot list at the target array.

3. The device of claim 1, wherein the volume is a member of a set of volumes in a replication group, the instructions comprising instructions executable by the processing resource to:
    create a subset of synchronization snapshots at a periodic synchronization time based on a user-defined subset of the set of volumes in the replication group; and
    incrementally replicate the subset of volumes to the target array such that the target array has a replica of the subset of volumes at the source array.

4. The device of claim 1, the instructions comprising instructions executable by the processing resource to:
    associate a replication object with the user-initiated RW snapshot; and add the replication object to a replication group, wherein the replication group includes a set of replication objects and an associated synchronization snapshot is created for each replication object of the set of replication objects at the periodic synchronization time.

5. The device of claim 1, the instructions comprising instructions executable by the processing resource to:
create a user-initiated RO snapshot of the volume;
identifying a resynchronization snapshot of the volume, wherein the resynchronization snapshot is a previous synchronization snapshot created at a previous periodic synchronization time and having a completed status;
identifying an oldest snapshot having a pending status, wherein the oldest snapshot is the user-initiated RO snapshot of the volume;
computing a data delta between the oldest snapshot and the resynchronization snapshot, wherein the data delta includes metadata;
replicating the data delta between the oldest snapshot and the resynchronization snapshot to the target array; and
updating the pending status of the oldest snapshot to a completed status after the replicating and after creation of a corresponding oldest snapshot at the target array.

6. The device of claim 5, the instructions comprising instructions executable by the processing resource to:
iteratively identify each snapshot having a pending status;
for each identified snapshot having a pending status, and in chronological order beginning with a least recent snapshot having a pending status:
compute a data delta between a least recent snapshot having a pending status and a most recent snapshot having a completed status,
replicate the data delta to the target array, and
update the pending status of the least recent snapshot to a completed status after the replications and after creation of a corresponding least recent snapshot at the target array,
marking the least recent snapshot as the resynchronization snapshot once the least recent snapshot has a completed status.

7. The device of claim 1, the instructions comprising instructions executable by the processing resource to:
iteratively identify each snapshot having a pending status that is associated with the system-initiated RO snapshot, in chronological order beginning with a least recent;
for each identified snapshot having a pending status, and in chronological order beginning with a least recent snapshot having a pending status:
compute a RO data delta between a least recent snapshot having a pending status that is associated with the system-initiated RO snapshot and a most recent snapshot having a completed status that is associated with the system-initiated RO snapshot,
replicate the RO data delta to the target array, and
update the pending status of the least recent snapshot to a completed status after the replication and after creation of a corresponding least recent snapshot at the target array;
update the pending status of the user-initiated RW snapshot to a completed status to indicate completion after creation of a corresponding user-initiated RW snapshot at the target array; and
mark a synchronization snapshot associated with the system-initiated RO snapshot for use as a resynchronization snapshot associated with the system-initiated RO snapshot once each snapshot associated with the system-initiated RO snapshot has a completed status.

8. The device of claim 7, the instructions comprising instructions executable by the processing resource to:
iteratively identify each snapshot having a pending status that is associated with the user-initiated RW snapshot;
for each identified snapshot associated with the user-initiated RW snapshot and having a pending status, and in chronological order beginning with a least recent snapshot having a pending status:
compute a RW data delta between a least recent snapshot having a pending status and a most recent snapshot having a completed status, each associated with the user-initiated RW snapshot,
replicating the RW data delta to the target array, and
update the pending status of the least recent snapshot that is associated with the user-initiated RW snapshot to a completed status; and
mark a synchronization snapshot associated with the user-initiated RW snapshot for use as a resynchronization snapshot associated with the user-initiated RW snapshot once each snapshot associated with the user-initiated RW snapshot has a completed status.

9. The device of claim 1, the instructions comprising instructions executable by the processing resource to:
receive an addition request to add a new volume to a set of volumes in a replication group including the volume, wherein the new volume includes a set of existing snapshots to be added to the replication group based on a user selection of the existing snapshots;
create a new synchronization snapshot of the new volume at the periodic synchronization time, the new synchronization snapshot having a pending status;
store, at the source array, each new snapshot of the new volume, wherein each new snapshot includes the user selected existing snapshots, and record each new snapshot via a new representative entry in a new original snapshot list;
incrementally replicate the new volume to the target array such that the target array has a replica of the new volume at the source array; and
request creation of a corresponding new snapshot at the target array after each incremental replication of the new volume such that each new snapshot recorded in the new original snapshot list is recreated and stored at the target array and the new original snapshot list is recreated as a new recreated snapshot list at the target array.

10. The device of claim 1, the instructions comprising instructions executable by the processing resource to:
create a synchronization snapshot of the volume at a periodic synchronization time, the synchronization snapshot having a pending status; and
after each incremental replication of the volume, request creation of a corresponding snapshot at the target array such that each snapshot recorded in the original snapshot list is recreated and stored at the target array and the original snapshot list is recreated as a recreated snapshot list at the target array.

11. A machine-readable storage medium comprising instructions executable by a processing resource to:
in response to a request, create, at a source array, a user-initiated read-write (RW) snapshot of a volume at the source array;
create, at the source array, a system-initiated read-only (RO) snapshot of the volume at the time the user-initiated RW snapshot is created;

determine that a resynchronization snapshot of the volume exists, wherein the resynchronization snapshot is a previous synchronization snapshot having a completed status;

based on at least the resynchronization snapshot and the system-initiated RO snapshot having a pending status, incrementally replicate a first portion of the volume to a target array; and perform an incremental replication of a second portion of the volume from the source array to the target array, based on the user-initiated RW snapshot, such that the target array has a replica of the second portion of the volume associated with the user-initiated RW snapshot; and request creation of a corresponding RW snapshot, corresponding to the user-initiated RW snapshot, at the target array after the incremental replication of the first portion of the volume.

12. The machine-readable storage medium of claim 11, the instructions comprise instructions executable by the processing resource to:

create a user-initiated RO snapshot in response to a user snapshot request; and set the user-initiated RO snapshot to have the pending status.

13. The machine-readable storage medium of claim 11, the instructions comprising instructions executable by the processing resource to:

based on the existence of the resynchronization snapshot and the existence of the user-initiated RO snapshot, replicate a data delta between the user-initiated RO snapshot and the resynchronization snapshot to the target array;

based on the absence of the resynchronization snapshot and the existence of the user-initiated RO snapshot, replicate the user-initiated RO snapshot to the target array;

based on the existence of the resynchronization snapshot and the absence of the user-initiated RO snapshot, replicate a data delta between the resynchronization snapshot and the synchronization snapshot to the target array; and based on the absence of the resynchronization snapshot and the absence of the user-initiated RO snapshot, replicate the synchronization snapshot to the target array.

14. The machine-readable storage medium of claim 11, the instructions comprising instructions executable by the processing resource to:

identify a least recent snapshot having a pending status; and incrementally replicate a data delta between the least recent snapshot having a pending status and a most recent snapshot having a completed status to the target array, wherein the target array performs duplicate detection to identify and prevent a duplicate replication.

15. A method comprising:

creating, at a source array, a user-initiated read-write (RW) snapshot of a volume of the source array, user-initiated read-write (RW) snapshot having a pending status;

creating, at the source array, a system-initiated read-only (RO) snapshot of the volume at the time the user-initiated RW snapshot is created;

performing a first incremental replication of a first portion of the volume from the source array to the target array, based on the system-initiated RO snapshot, such that the target array has a replica of the first portion of the volume associated with the system-initiated RO snapshot;

performing a second incremental replication of a second portion of the volume from the source array to the target array, based on the user-initiated RW snapshot, such that the target array has a replica of the second portion of the volume associated with the user-initiated RW snapshot; and requesting creation of a corresponding RW snapshot, corresponding to the user-initiated RW snapshot, at the target array after the first incremental replication of the first portion of the volume.

16. The method of claim 15, further comprising:

receiving an addition request to add a new volume to a set of volumes in a replication group, wherein the new volume includes a set of existing snapshots to be added to the replication group based on a user selection of the existing snapshots;

creating a new synchronization snapshot of the new volume at a periodic synchronization time, the new synchronization snapshot having a pending status;

storing, at the source array, each new snapshot of the new volume, wherein each new snapshot includes the user selected existing snapshots, and recording each new snapshot via a new representative entry in a new original snapshot list;

incrementally replicating the new volume to the target array such that the target array has a replica of the new volume at the source array; and requesting creation of a corresponding new snapshot at the target array after each incremental replication of the new volume such that each new snapshot recorded in the new original snapshot list is recreated and stored at the target array and the new original snapshot list is recreated as a new recreated snapshot list at the target array.

* * * * *